United States Patent

Gaudreau et al.

[11] Patent Number: 5,942,991
[45] Date of Patent: Aug. 24, 1999

[54] RESONANT SENSOR SYSTEM AND METHOD

[75] Inventors: Marcel P. J. Gaudreau, Lexington; Robert A. Weisenseel, Arlington, both of Mass.

[73] Assignee: Diversified Technologies, Inc.

[21] Appl. No.: 08/466,374

[22] Filed: Jun. 6, 1995

[51] Int. Cl.[6] .................................................. G08B 21/00
[52] U.S. Cl. .............. 340/870.16; 340/505; 340/870.31; 340/825.54; 324/337
[58] Field of Search .................. 340/870.16, 870.28, 340/870.29, 870.3, 870.31, 505, 825.54, 870.01, 870.18, 601, 690, 547; 324/334, 337; 342/22

[56] References Cited

U.S. PATENT DOCUMENTS

| | | | |
|---|---|---|---|
| 3,656,132 | 4/1972 | Brumbelow | 340/870.28 |
| 4,160,971 | 7/1979 | Jones et al. | 340/505 |
| 4,862,088 | 8/1989 | Etienne et al. | 324/326 |
| 5,287,059 | 2/1994 | Ando et al. | 324/253 |

*Primary Examiner*—Michael Horabik
*Assistant Examiner*—Timothy Edwards, Jr.
*Attorney, Agent, or Firm*—Testa, Hurwitz & Thibeault, LLP

[57] ABSTRACT

Apparatus, and related method, for remotely measuring at least one environmental condition includes an electromagnetically resonant sensor having a measurable resonance characteristic (e.g., center resonance frequency, quality factor, or bandwidth) that varies in correspondence to changes in the environmental condition present at the sensor. The sensor emits an electromagnetic return signal representative of a state of the resonance characteristic when an electromagnetic excitation signal impinges on the sensor. The electromagnetic excitation signal is generated by a generator located separate and away from the sensor, and the excitation signal is then directed at the remote sensor. The sensor thus remotely detects and measures the environmental condition. In one embodiment, the sensor is an electromagnetically resonant electrical circuit. In another embodiment, the sensor is an antenna resonator (e.g., a half-wavelength antenna) made of a conductive material.

19 Claims, 5 Drawing Sheets

RESONANT SENSOR SYSTEM AND METHOD

FIELD OF THE INVENTION

This invention relates to remote wireless sensors and related methods, and more particularly, to remote wireless radio frequency real-time resonance sensors and related methods. Such sensors detect and measure specific environmental changes through sensor resonance characteristics that vary with changes in sensor environmental conditions.

BACKGROUND OF THE INVENTION

Environmental conditions such as temperature, strain, cracks, gross deformations, delamination of composites, wear, acceleration, vibration, sound, corrosion, electric field, magnetic field, moisture, ice deposition, conductivity, permittivity, permeability, and other related characteristics can be measured using known sensors. Most known sensors for monitoring environmental conditions generally require a close connection to processing and display equipment to retrieve measurement information. This connection could be a mechanical connection, a physical electrical conductor connection, or a very short range inductive connection.

Known sensors that do not require such close connections for measuring these environmental characteristics generally involve associated difficulties that reduce their effectiveness. Examples of such known sensors and the difficulties associated therewith follow. A laser measurement system generally is expensive and requires a direct line-of-sight to the environment to be measured. An X-ray or nuclear magnetic resonance imaging system generally is expensive, is of significant size and weight, and requires significant processing time for film or data. An ultrasonic measurement system requires an acoustically-conductive medium. A sensor having an active power source and transmitter generally is bulky, and weighs and costs a significant amount.

SUMMARY OF THE INVENTION

The invention relates to a small and lightweight sensor system, and related method, for direct real-time monitoring of environmental conditions. The sensor can monitor environmental conditions without the use of close connections such as mechanical connections, physical electrical conductor connections, or very short range inductive connections.

In addition to being able to detect the presence and absence of one or more environmental conditions, the sensor can measure the extent of the presence. That is, the sensor according to the invention can measure the value of the condition(s), and it can measure a continuum of states for each environmental condition. For example, the sensor generally can measure a change in temperature from T1 (a given state or value of the temperature) to T2 (a different temperature state) regardless of whether that change is relatively small, relatively large, or somewhere between small and large.

The environmental conditions which the sensor can monitor include strain, temperature, cracks, gross deformations, delamination of composites, wear of material, acceleration, vibration, sound, corrosion, electric field, magnetic field, moisture, ice deposition, conductivity, permittivity, or permeability. It also is possible to monitor other environmental factors with the sensor.

External equipment for use with the small, lightweight sensor to process and display the information measured by the sensor generally is simple and uncomplicated.

When the sensor is employed, it is unnecessary to have a direct line of sight between the sensor and the environment to be monitored. Use of the sensor does not involve undue data or materials processing time. The sensor does not require closely physically located power sources or transmitters that could add bulk and/or weight to the sensor itself. An acoustically-conductive medium also is not required to use the sensor of the invention.

In accordance with the invention, a resonant sensor system, and related method, allows monitoring of at least one distinct environmental condition. The system includes a resonant sensor which has at least one measurable resonance characteristic such as resonant frequency and/or quality factor. For a given state of the condition, the resonant sensor has certain particular resonance characteristics such as, for example, a resonant frequency F1 or a quality factor Q1. Upon encountering a change in the condition, the sensor's resonant frequency (or quality factor) shifts, and the sensor resonates at another frequency F2 (or has another quality factor Q2) that corresponds to a new state of the condition. By sweeping through a range of frequencies, which includes F1 and F2, and monitoring the signals returned by the sensor, the resonance characteristics (e.g., resonant frequency and/or quality factor) of the sensor can be monitored. Based on the shift in resonant frequency (or quality factor), the severity of the condition can be determined.

The resonance characteristics of the sensor generally are resonant center frequency, quality factor, bandwidth, and peak amplitude.

A resonant sensor according to the invention thus measures at least one environmental condition by varying at least one of its resonance characteristics in correspondence with changes in the environmental condition to be monitored. The sensor can be tailored to measure a particular condition by making its resonance characteristic(s) change in correspondence to changes in that particular condition. Tailoring generally entails selection of materials, geometry, and frequency ranges. In addition, sensor position can be determined by measurement from different directions and triangulation methods.

In one embodiment of the invention, a resonant electrical circuit acts as the sensor which can be activated and used to measure sensor environmental conditions remotely with no wire connections. An electromagnetic signal generated by a remote generator is directed at the sensor from a distance. This electromagnetic signal can be varied in frequency. A signal impinging on the sensor at or near its resonant frequency will excite the sensor. The sensor will then radiate an electromagnetic signal at the frequency at which it was excited. The amplitude of this re-radiated electromagnetic signal depends on the proximity of the excitation frequency to the sensor resonant frequency and the quality factor, or Q, of the sensor. Q is equal to the fractional bandwidth of the resonance, or the frequency of peak amplitude divided by the difference between the frequency of the higher frequency half-power amplitude and the frequency of the lower frequency half-power amplitude. By sweeping a frequency range in which the sensor resonance is known to lie with the electromagnetic signal and measuring the reradiated response, the entire resonance characteristics (i.e., frequency, Q, bandwidth, etc.) of the sensor can be measured.

In the resonant electrical circuit embodiment, the resonance characteristics of the sensor, including frequency and Q, vary with changes in the principal electrical characteristics of the circuit: inductance, capacitance, and resistance.

Frequency is primarily a function of inductance and capacitance. Q is primarily related to resistance. These electrical characteristics depend on current sensor environmental conditions. For example, a vibration would cause the distance between the parallel plates of a simple capacitor to change, altering circuit capacitance and changing resonant frequency. In another example, capacitance could be varied by introduction of a material with a different permittivity than that normally present between capacitor plates, again altering capacitance and resonant frequency. Resistance could be altered by introduction of a material that is more conductive than that normally present, resulting in a change in Q.

In another embodiment of the invention, a resonant sensor system comprises an antenna resonator. This antenna resonator preferably is a half-wavelength antenna resonator, but it can also be a quarter-wavelength antenna resonator or an antenna resonator having a different length such as some multiple of a half-wavelength or a quarter-wavelength. This resonant sensor could be excited and measured in exactly the same fashion as described previously for the resonant electrical circuit embodiment. For the antenna embodiment, however, the sensor's resonant frequency varies with antenna length. This antenna embodiment has a variety of applications such as measuring wear of a material in which the sensor is embedded through changes in the length of the sensor. For example, the antenna could be embedded into the tread of a tire such that it wears as the tread wears from use. In measuring sensor wear with the antenna resonator, as the length of the sensor decreases (due to wear), the resonant frequency of the sensor increases.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1A:
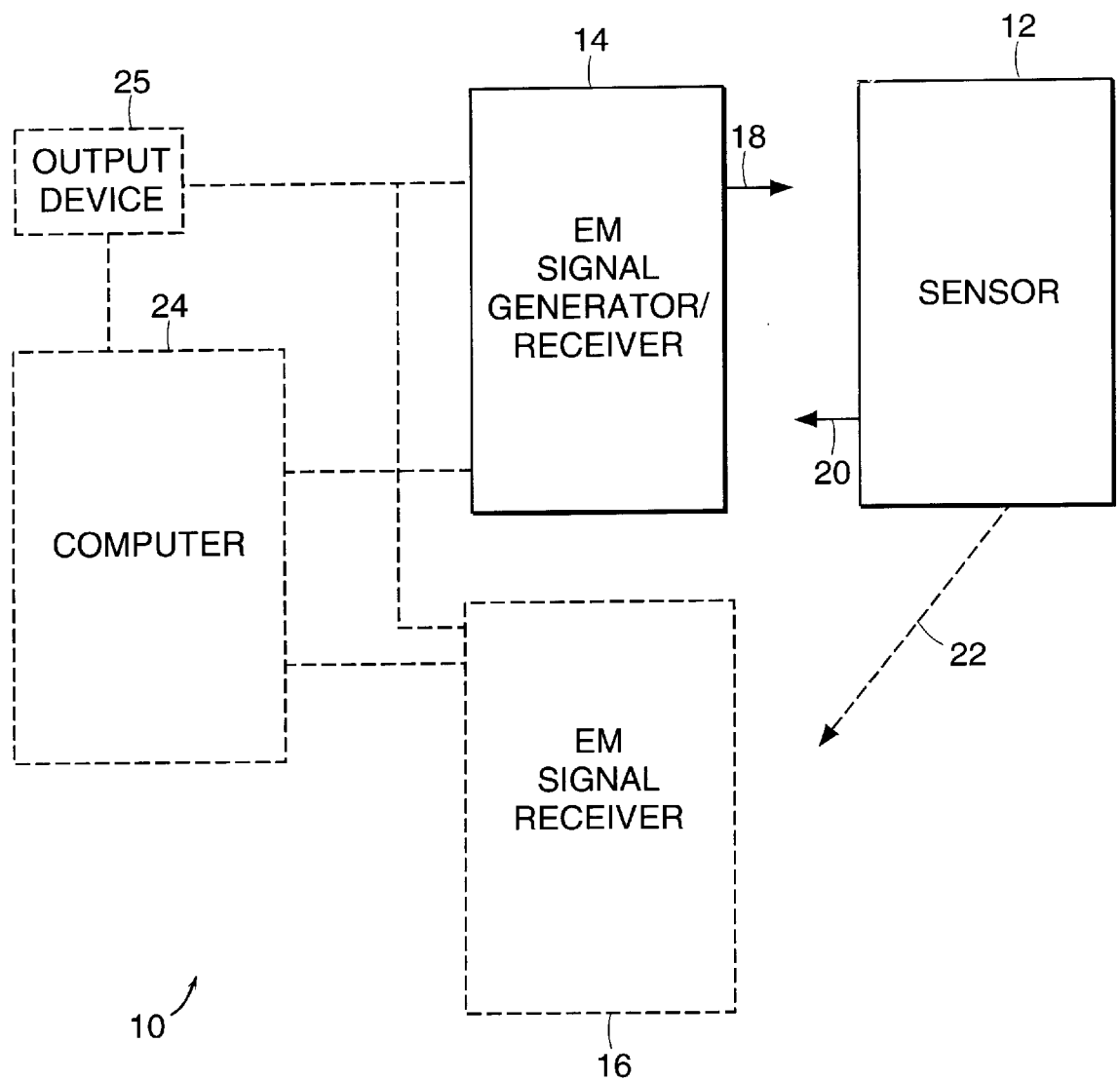
FIG. 1A is a block diagram of a remote wireless sensor system including a resonant sensor according to the invention.

Referring to FIG. 1, a resonant sensor system 10 for remotely measuring at least one environmental condition includes at least one electromagnetically resonant sensor 12. For a given state of the condition(s) of interest measured at the location of the sensor 12, the sensor 12 has certain resonance characteristics such as a resonant frequency of F1 or a quality factor of Q1. Upon a change in the state of the condition(s), the resonance characteristics of the sensor 12 change. For example, the resonant frequency (or the quality factor) of the sensor 12 will shift to a different resonant frequency, F2 (or a different quality factor, Q2). By sweeping through a range of frequencies to excite the sensor 12 therewith and then monitoring the signals returned by the sensor 12, it can be determined if the sensor 12 is returning signals at or near the F2 resonant frequency (or with approximately the Q2 quality factor). If the sensor 12 returns a signal at about frequency F2 (or with approximately quality factor Q2) in response to the excitations, it is an indication that the sensor 12 is encountering the state of the environmental condition(s) of interest corresponding to frequency F2 (or to quality factor Q2).

Environmental conditions which can be measured according to the invention include temperature, strain, cracks, gross deformations, delamination of composites, wear, acceleration, vibration, sound, corrosion, electric field, magnetic field, moisture, ice deposition, conductivity, permittivity, and permeability. Other related environmental conditions and/or characteristics also can be measured with the invention.

The resonant sensor system 10 includes a electromagnetic (EM) signal generator and receiver 14 for generating electromagnetic excitation signals and directing them to the sensor 12. The generator and receiver 14 also can receive signals returned by the sensor 12 in response to the excitation signals impinging thereon. In some embodiments, the generator 14 is a separate device from a receiver or monitor 16, and in these embodiments the generator 14 and the receiver 16 typically are located near each other. Whether the generator and the receiver are separate devices (14 and 16) or integrated into a single device (14), the sensor 12 is separate from and unconnected to the generator or the receiver. The generator 14 generates EM excitation signals within a predetermined frequency range which includes F1 and F2. The generator 14 typically sweeps through the range of frequencies and generates an EM excitation signal at a plurality of frequencies within the range. In a preferred embodiment, the frequencies of the EM excitation signals are in the radio-frequency (RF) band. An arrow 18 represents the excitation signals which are directed to the remote wireless sensor 12 by the generator. If EM excitation signals at or near the resonant frequency of the sensor 12 impinge upon the sensor 12, the sensor 12 resonates at about that frequency and emits electromagnetic return signals at about that frequency in response to the excitation. If the state of the environmental condition of interest present at the sensor 12 corresponds to a resonant frequency of the sensor 12 of F2, the sensor 12 will resonate at about that frequency (i.e., F2). If the state of the environmental condition of interest present at the sensor 12 corresponds to a quality factor of the resonance of the sensor 12 of Q2, the resonance of sensor 12 will have a quality factor of Q2. An arrow 20 (or 22) represents the signals returned by the sensor 12 in response to the excitation signals 18. These return signals are representative of a state of the resonance characteristic (e.g., resonant frequency F1 or F2, quality factor Q1 or Q2, etc.) of the sensor 12 which in turn corresponds to a state of the environmental condition (e.g., temperature T1 or T2) present at the sensor 12.

The resonant sensor system 10 typically also includes a computer 24, or other processing device, for coupling to the generator/receiver (14 and/or 16) to control the generation of the EM excitation signals 18 and/or to process the EM signals returned by the sensor 12 in response to the excitations. The computer 24 can determine, based on the signals returned by the sensor 12, the state of the condition(s) of interest at the remote wireless sensor location. The computer 24 can be a personal computer or a workstation, and it can include various typical peripheral devices including a disk drive and/or a tape drive for storing, among other things, data relating to the signals sent to and/or received from the sensor 12. Some type of interface device (not shown in FIG. 1) typically is necessary to couple the computer 24 to the generator/receiver (14 and/or 16). Also, some type of display or other output device 25 (e.g., printer, plotter, etc.) typically is connected to the computer 24 (or the generator/receiver 14 and/or 16) for providing a user/operator with a visual indication of the state of the environmental condition present at the sensor 12 at a particular time or the changes in the states of the condition over a period of time.

In the system 10, the varying-frequency EM excitation signals 18 from the generator 14 impinge on the remote wireless sensor 12. A signal impinging on the sensor 12 which is at or near the resonant frequency of the sensor 12 will excite the sensor 12, and the sensor 12 will then, in response thereto, radiate an electromagnetic signal at the frequency at which it was excited. The amplitude of this return electromagnetic signal from the sensor 12 depends on the proximity of the excitation signal's frequency to the sensor's resonant frequency and the quality factor (Q) of the sensor 12. By sweeping through a frequency range in which the sensor resonance is known to lie and then measuring the return signals from the sensor 12, the resonance characteristics of the sensor 12, including frequency and Q, can be measured.

Figure 1B:
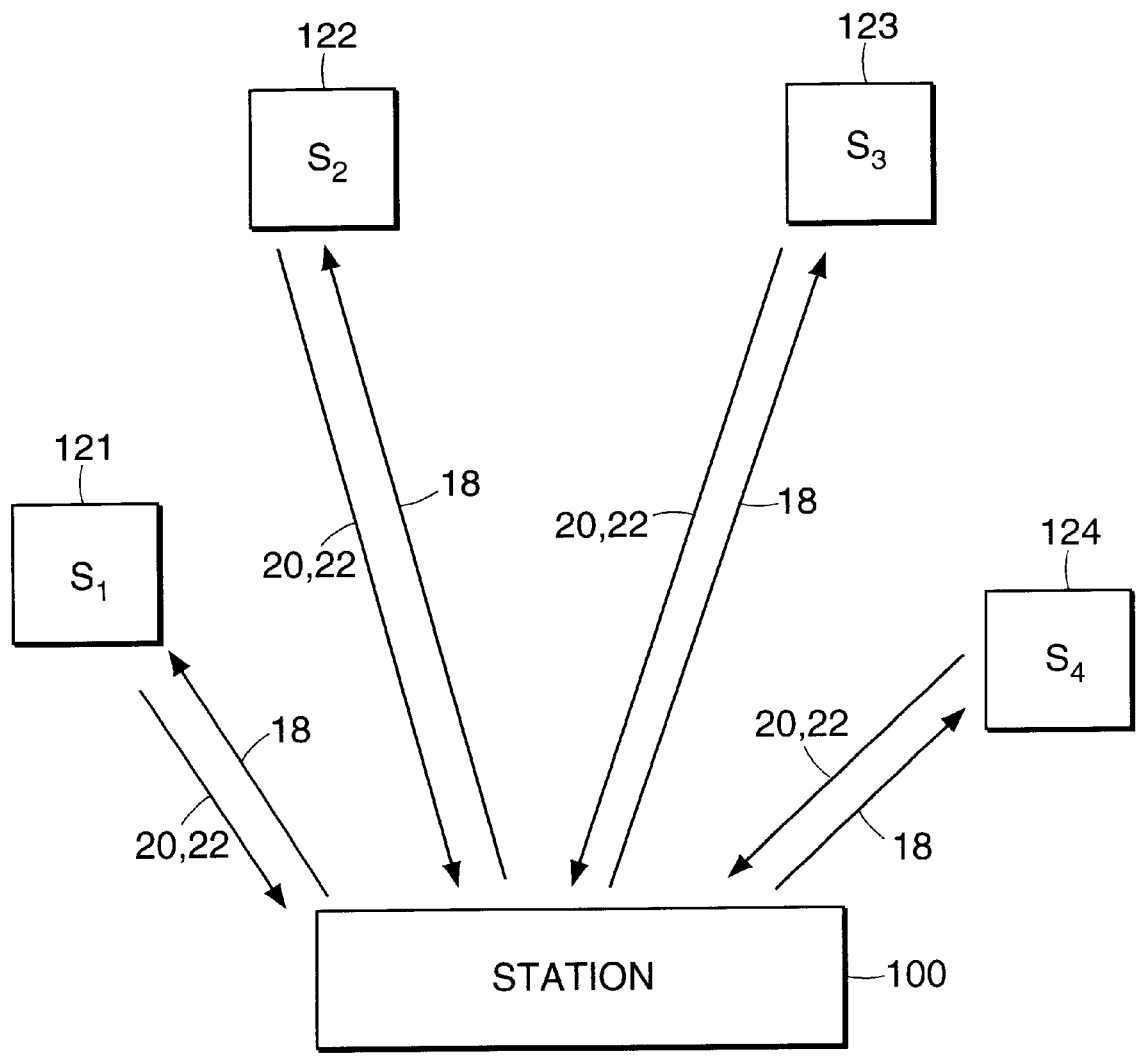
FIG. 1B is a diagram of a plurality of resonant sensors located at various remote locations away from a central station.

One or more sensors according to the invention can be placed at one or more remote locations, and the return signals thereof will provide measurements at those remote locations of the environmental condition(s) of interest. Referring to FIG. 1B, four sensors (S1, S2, S3, and S4) are located at four different remote locations, and a central station 100 is located away from the four sensors for generating excitation signals, receiving return signals, and controlling/processing the excitation and return signals.

Figure 1C:
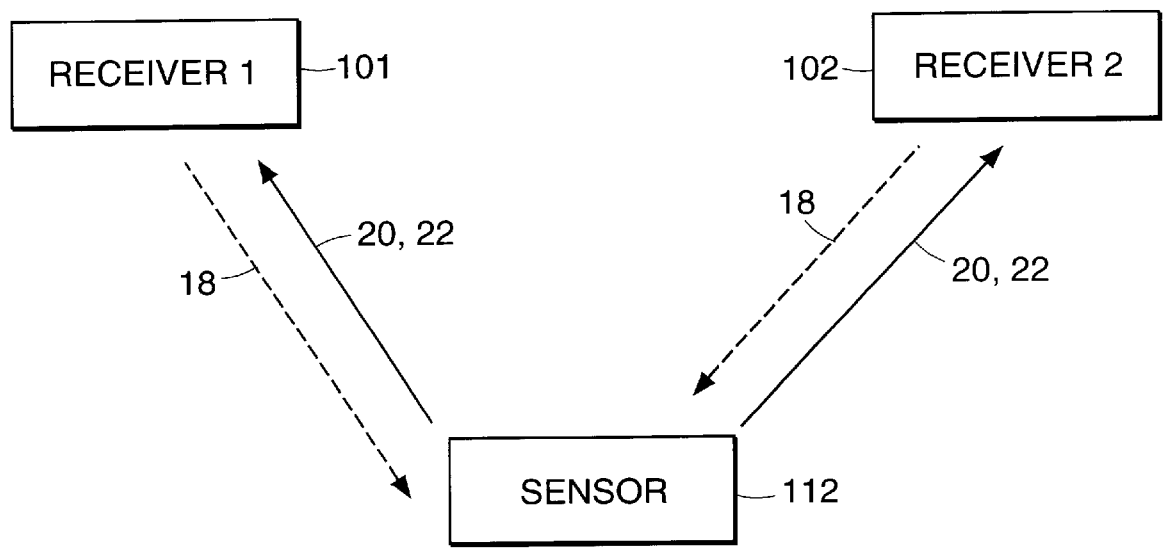
FIG. 1C is a diagram of a system for determining resonant sensor position.

Individual sensor position can be determined by, for example, measurement from different directions (e.g., exciting the sensor with signals from two or more locations) and then utilizing triangulation methods. Referring to FIG. 1C, the position of a particular sensor 12 can be determined using two or more receivers 101, 102. A transmitter may be located with one or each of the receivers 101, 102. Alternatively, the transmitter(s) may be physically separate from the receivers 101, 102. Triangulation is a process by which two or more receivers are used to determine the position of a target sensor. The process is used in tracking systems that use passive receiving elements such as some radar systems. In a preferred embodiment, two or more receiving elements have directional receiving capability, a known separation distance (often called the baseline), and angular measurement capability. By rotation, these receiving elements individually maximize their received signal from a sensor. Using measured angular data from the receiving elements and the known baseline, the location of the particular sensor whose re-radiated signal is being received can be determined accurately with known trigonometry. The trigonometry necessary can be performed on a computer or other processing device. The accuracy of the triangulation depends on the length of the baseline relative to the distance from the receiving elements to the sensor. The receiving elements and sensor must be non-collinear. These two latter criteria are readily controllable in the majority of applications for this sensor, but any situations in which these criteria arise can be corrected by using a longer baseline or more than two receiving elements. The angular data may include two angular dimensions for each receiving element for three-dimensional location requirements. An alternative embodiment might use non-directional receiving elements and known baselines by comparing relative amplitudes of received transmitter radiated and sensor re-radiated signals for relative distance measurements. Combinations of the aforementioned methods are also possible as are other triangulation methods that are known and/or will be apparent to one of ordinary skill.

Figure 2:
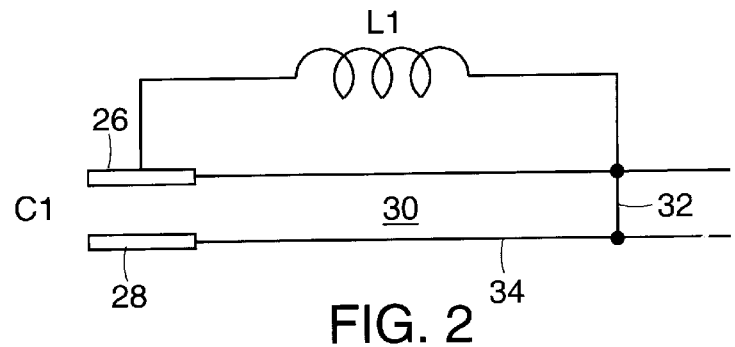
FIG. 2 is a schematic of a resonant sensor according to the invention showing a substrate in cross-section.

Referring to FIG. 2, in one embodiment according to the invention, a resonant sensor comprises an electromagnetically resonant electrical circuit of a capacitor C1 in series or parallel with an inductor L1 to provide the electromagnetic resonant frequency of the sensor. The capacitor C1 is formed of two opposing capacitor plates 26, 28 on respective opposite surfaces of a substrate 30. The substrate preferably is made of a dielectric or electrically insulative material. One end of the inductor L1 is connected to one of the capacitor plates 26, and the other end of the inductor L1 is connected to a conductive interconnection 32 that passes through the substrate 30. The conductive interconnection 32 extends through the substrate 30 and is coupled to the bottom capacitor plate 28 via a conducting path 34.

Figure 3A:
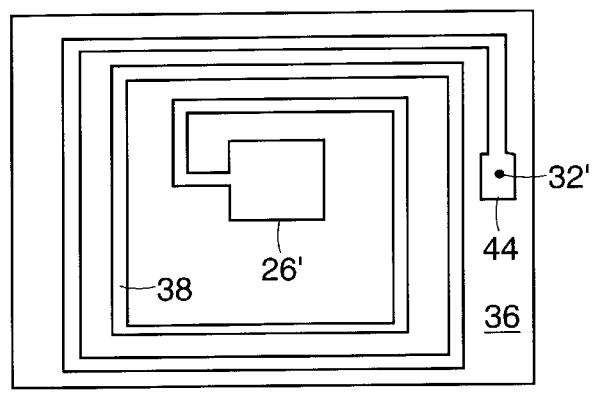
FIG. 3A shows one surface of a substrate of an embodiment of the sensor of FIG. 2.
Figure 3B:
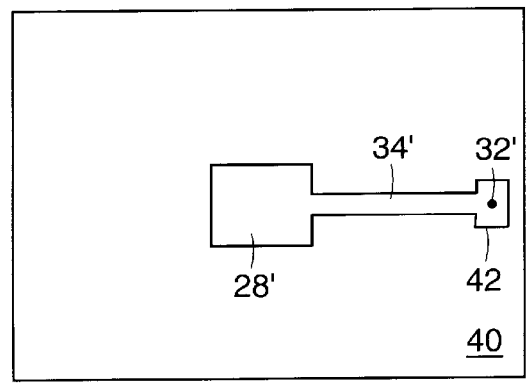
FIG. 3B shows the opposing surface of the substrate of the sensor of FIG. 3A.

In some embodiments, the sensor circuit of FIG. 2 is formed by conductive surfaces on the two sides of the substrate 30. Referring to FIGS. 3A and 3B, the top surface 36 of the substrate 30 has one of the capacitor plates 26' formed thereon by a conductive material. The inductor L1 also is formed on this top surface 36 of the substrate 30, and in this embodiment it is formed as a flat rectangular spiral 38 on that surface. It is possible to form the inductor L1 in other shapes on the surface 36 such as a circular spiral. Also, the number of turns can be more or less than shown in FIG. 3A. The bottom surface 40 of the substrate 30 has the other capacitor plate 28' formed thereon by a conductive material. A conducting path 34' connects the bottom capacitor plate 28' to a bottom conductive pad 42, and this bottom pad 42 is coupled to a top conductive pad 44 by a conductive interconnection 32'. The top plate 26' and the top pad 44 generally are in alignment with the bottom plate 28' and the bottom pad 42.

Figure 3C:
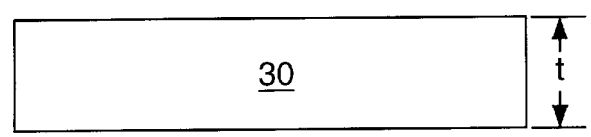
FIG. 3C is a side view of the substrate of FIGS. 3A and 3B showing the thickness of the substrate.

In FIGS. 3A and 3B, the substrate 30 preferably is a substrate such as a thick-film or a thin-film substrate having a thickness, t, (as shown in FIG. 3C) of about 5 $\mu$m to about 4 mm. The substrate 30 serves as the dielectric between the parallel plates 26', 28' of the capacitor. The substrate 30 also serves as the supporting substrate for the circuit, i.e., the surface on which the conductive strips/areas (26', 28', 34', 38, 42, 44) are deposited or otherwise formed. The material used for the conductive strips/areas on the surfaces of the substrate 30 generally can be any conductive material such as copper, silver, gold, or aluminum or high temperature conductors such as tungsten or molybdenum.

The resonant frequency of the sensor circuit of FIGS. 2 and 3A–3C can be altered or tailored to make the sensor circuit more suited for measuring certain types of environmental conditions. For example, the dielectric material used for the substrate 30 can be selected such that its electrical properties (i.e., permittivity) change when the environmental condition of interest is present and this change in electrical properties in turn causes the resonant frequency of the sensor circuit to change. Also, if a vibration (the environmental condition of interest) causes the distance between the parallel plates 26', 28' of the capacitor to change, the value of the capacitance will change and this will result in a change in the resonant frequency of the sensor circuit such that the sensor circuit can measure vibration. In another example, a dielectric substrate material having a conductivity greater than that normally present between the capacitor plates 26', 28' can be used, and this will result in a change in the Q value of the sensor circuit. In general, a sensor circuit tailored for a specific application would change resonance with the environmental condition to be sensed. Tailoring typically entails selection of materials, geometry, and/or frequency ranges.

The sensor circuit embodiment of FIGS. 3A–3C can be assembled into a sensor package as small as 2 mm by 2 mm by 15 μm. The weight of this small sensor circuit is less than 0.5 mg. The cost to manufacture this small, lightweight sensor circuit is relatively small, and it is very reliable due to its relatively simple design. The sensor circuit requires no internal or direct-connected power source such as a battery pack.

Figure 4:
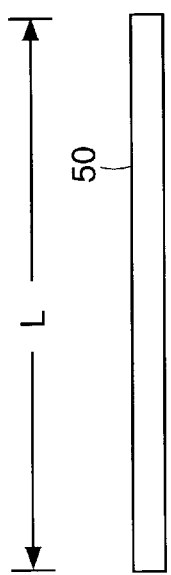
FIG. 4 is a diagram of another resonant sensor, an antenna resonator, according to the invention.

Referring to FIG. 4, in another embodiment according to the invention, a resonant sensor comprises an antenna resonator 50. This antenna resonator 50 preferably is a half-wavelength antenna resonator, but it can also be a quarter-wavelength antenna resonator or an antenna resonator having a different length such as some multiple of a half-wavelength or a quarter-wavelength. The antenna resonator 50 can be excited and monitored in a manner similar to that described previously for the sensor circuit embodiment of FIGS. 2 and 3A–3C. Unlike the sensor circuit embodiment, however, the resonant frequency of the antenna resonator varies with the length, L, of the antenna. The antenna resonator has a variety of possible applications such as measuring wear. Straining or wearing down the antenna 50 results in a change in the resonant frequency of the antenna resonator sensor 50. The antenna resonator sensor 50 thus is particularly well suited to detecting and measuring gross deformation, strain, wear, corrosion, and other related conditions.

It is possible to measure environmental conditions in two dimensions by using two antenna resonator sensors 50 placed, for example, orthogonal to each other.

The antenna resonator 50 is made of a conductive material such as copper, silver, gold, aluminum or high temperature conductors such as tungsten or molybdenum. The length, L, of the antenna resonator 50 generally will vary depending on the application, but a typical range is about 1 cm to about 2 cm. Just as the sensor circuit embodiment of FIGS. 2 and 3A–3C can be tailored for detection and measurement of a particular environmental condition of interest, the length, L, of the antenna 50 can be changed to set the range of wear or strain measurement and the range of operational frequencies.

The antenna resonator sensor 50 of FIG. 4 enjoys similar size, cost, weight, and reliability advantages as described previously for the sensor circuit embodiment of FIGS. 2 and 3A–3C.

Figure 5:
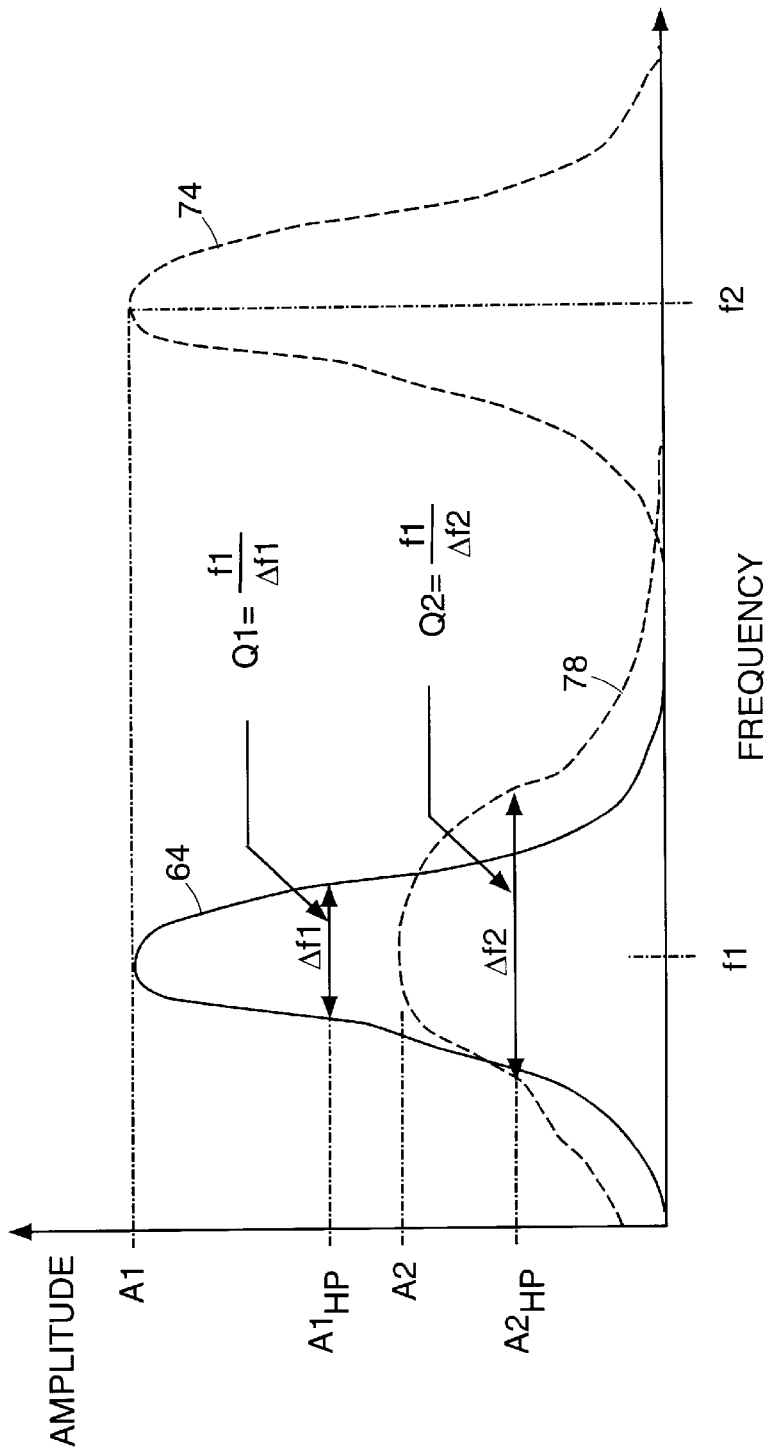
FIG. 5 is a graph of resonance characteristics of a sensor according to the invention.

Referring to FIG. 5, in a graph of amplitude (vertical axis) versus frequency (horizontal axis), an initial resonance curve or electromagnetic return signal 64 has a resonant center frequency of f1 and a bandwidth of Δf1. This return signal 64 represents the response of a resonant sensor according to the invention when the sensor encounters a particular state of an environmental condition of interest.

The bandwidth, Δf1, of this return signal 64 can be defined as the difference between the upper and lower frequencies at the half-power amplitude, $A1_{HP}$. $A1_{HP}$ can be defined as one-half multiplied by the square root of two multiplied by the peak amplitude, A1, of the initial resonance 64, or approximately 0.7071 times A1. A quality factor Q1 associated with the signal 64 can be defined as f1 divided by Δf1 (i.e., Q1=f1/Δf1). The resonance frequency f1 is that frequency at which the peak amplitude A1 is perceived. The return signal 64 can be completely defined by two resonance characteristics: f1 and Q1.

Also shown in FIG. 5 is a frequency-shifted return signal 74 which has the same quality factor, Q1, as the initial resonance curve 64 but a different resonance frequency, f2, at the same peak amplitude, A1. This frequency-shifted return signal 74 represents the response of the sensor to a new state of the condition after the condition has changed from the initial particular state to the new state.

FIG. 5 also shows another resonance curve which is a Q-shifted return signal 78 having the same resonance frequency, f1, as the curve 64, but with a different quality factor, Q2, defined by Q2=f1/Δf2. This Q-shifted return signal 78 represents the response of the sensor to a new state (which in general is not the same state as the new state mentioned in the preceding paragraph) of the condition after the condition has changed from the initial particular state to the new state. The bandwidth, Δf2, of this return signal 78 can be defined as the difference between the upper and lower frequencies at the half-power amplitude, $A2_{HP}$, which can be defined as one-half multiplied by the square root of two multiplied by the peak amplitude, A2, of the resonance 78, or approximately 0.7071 times A2.

Thus, it can be seen that generating electromagnetic excitation signals in a frequency range that includes the frequencies of the possible resonance(s) of interest (e.g., f1 and f2) and then monitoring the signal(s) returned by the sensor (or sensors) at or near the resonance frequency or frequencies can completely define the resonance characteristics of the sensor(s). Because the resonance characteristics of the sensor(s) vary in a known way with changes in the environmental condition(s) of interest being measured at the location of the sensor(s), it is possible to use the sensor(s) to monitor changes in the condition(s).

Variations, modifications, and other implementations of what is described herein will occur to those of ordinary skill in the art without departing from the spirit and the scope of the invention as claimed. Accordingly, the invention is to be defined not by the preceding illustrative description but instead by the following claims.

What is claimed is:

1. Apparatus for remotely measuring at least one environmental condition, comprising:

an electromagnetically resonant sensor having a resonance frequency which varies as a result of at least one physical change to the sensor, the at least one physical change being due to one or more changes in the at least one environmental condition, the sensor emitting an electromagnetic return signal having a frequency at or near the resonance frequency when an electromagnetic excitation signal having a frequency at or near the resonance frequency impinges on the sensors; and an electromagnetic excitation signal generator which is separated from the sensor and located away from the sensors and which generates the electromagnetic excitation signal having the frequency at or near the resonance frequency.

2. The apparatus of claim 1 wherein the sensor comprises an antenna resonator made of a conductive material.

3. The apparatus of claim 1 further comprising at least two receivers for receiving the electromagnetic return signal, the receivers being separate from the sensor, located away from the sensor, and located a distance away from each other.

4. The apparatus of claim 1 wherein the sensor comprises an electromagnetically resonant electrical circuit.

5. The apparatus of claim 4 wherein the electromagnetically resonant electrical circuit comprises a capacitance and an inductance.

6. The apparatus of claim 5 wherein the circuit comprises a substrate having two opposing surfaces, one surface having a first capacitor plate and an inductor thereon and the other surface having a second capacitor plate thereon.

7. Apparatus for remotely measuring an environmental condition, comprising:

an electromagnetically resonant senor having a resonance frequency which varies as a result of at least one physical change to the sensor, the at least one physical change being due to one or more changes in the environmental condition;

a generator, separate from the sensor and located remote from the sensor, for generating at least one electromagnetic excitation signal having a frequency at or near the resonance frequency; and a monitor, separate from the sensor and located remote from the sensor, for detecting at least one electromagnetic return signal returned by the sensor in response to the at least one electromagnetic excitation signal, the at least one electromagnetic return signal having a frequency at or near the resonance frequency.

8. The apparatus of claim 7 wherein the sensor comprises an antenna resonator made of a conductive material.

9. The apparatus of claim 7 further comprising at least two of the monitors, the monitors being located a distance away from each other.

10. The apparatus of claim 8 wherein the sensor comprises an electromagnetically resonant electrical circuit.

11. The apparatus of claim 10 wherein the electromagnetically resonant electrical circuit comprises a capacitance and an inductance.

12. The apparatus of claim 11 wherein the circuit comprises a substrate having two opposing surfaces, one surface having a first capacitor plate and an inductor thereon and the other surface having a second capacitor plate thereon.

13. A method of remotely measuring an environmental condition, comprising:

providing an electromagnetically resonant sensor at a first location, the sensor having a resonance frequency which varies as a result of at least one physical change to the sensor, the at least one physical change being due to one or more changes in the environmental condition;

generating at least one electromagnetic excitation signal with an electromagnetic signal generator which is separate from the sensor and disposed at a second location remote from the first location, the at least one electromagnetic excitation signal having a frequency at or near the resonance frequency; and monitoring for at least one electromagnetic return signals returned by the sensor in response to the at least one electromagnetic excitation signal, the at least one electromagnetic return signal having a frequency at or near the resonance frequency.

14. The method of claim 13 wherein the step of providing the electromagnetically resonant sensor comprises providing an antenna resonator made of a conductive material.

15. The method of claim 13 further comprising, after the step of generating the at least one electromagnetic excitation signal, directing the at least one electromagnetic excitation signal from the second location to the first location such that the at least one electromagnetic excitation signal impinges on the sensor.

16. The method of claim 13 wherein the step of monitoring further comprises monitoring from two separate locations, both of which are located away from the first location and located a distance away from each other.

17. The method of claim 13 wherein the step of providing the electromagnetically resonant sensor comprises providing an electromagnetically resonant electrical circuit.

18. The method of claim 17 wherein the step of providing the electromagnetically resonant electrical circuit comprises providing a capacitance and an inductance.

19. The method of claim 18 wherein the step of providing the capacitance and the inductance comprises providing a substrate having two opposing surfaces, one surface having a first capacitor plate and an inductor thereon and the other surface having a second capacitor plate thereon.

* * * * *

UNITED STATES PATENT AND TRADEMARK OFFICE
CERTIFICATE OF CORRECTION

PATENT NO.   : 5,942,991
DATED        : August 24, 1999
INVENTOR(S)  : Marcel P. J. Gaudreau and Robert A. Weisenseel It is certified that error appears in the above-identified patent and that said Letters Patent is hereby corrected as shown below:

Column 9, claim 10, line 1, change "claim 8" to ---claim 7---

Column 10, claim 13, line14, change "return signals" to ---return signal---

Signed and Sealed this

Nineteenth Day of September, 2000

*Attest:*

Q. TODD DICKINSON

*Attesting Officer*        *Director of Patents and Trademarks*